(12) United States Patent
Sun et al.

(10) Patent No.: US 10,747,460 B2
(45) Date of Patent: Aug. 18, 2020

(54) METHOD, DEVICE AND COMPUTER PROGRAM PRODUCT FOR CHANGING TYPE OF STORAGE SYSTEM

(71) Applicant: EMC IP Holding Company LLC, Hopkinton, MA (US)

(72) Inventors: Lei Sun, Beijing (CN); Jian Gao, Beijing (CN); Geng Han, Beijing (CN); Jibing Dong, Beijing (CN); Hongpo Gao, Beijing (CN); Xiongcheng Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/248,015

(22) Filed: Jan. 15, 2019

(65) Prior Publication Data
US 2019/0220213 A1    Jul. 18, 2019

(30) Foreign Application Priority Data

Jan. 18, 2018  (CN) .......................... 2018 1 0049640

(51) Int. Cl.
*G06F 3/06* (2006.01)
(52) U.S. Cl.
CPC .......... *G06F 3/0644* (2013.01); *G06F 3/0619* (2013.01); *G06F 3/0689* (2013.01)
(58) Field of Classification Search
CPC ..... G06F 3/0644; G06F 3/0619; G06F 3/0689
USPC ......................................................... 711/114
See application file for complete search history.

(56) References Cited

U.S. PATENT DOCUMENTS

| | | | | |
|---|---|---|---|---|
| 2004/0109371 | A1* | 6/2004 | Tsukidate ............... | G11C 29/24 365/201 |
| 2006/0062211 | A1* | 3/2006 | Manthoulis .......... | G06Q 10/067 370/386 |
| 2006/0221752 | A1* | 10/2006 | Fasoli ..................... | G11C 5/02 365/230.03 |
| 2008/0192524 | A1* | 8/2008 | Fasoli ..................... | G11C 5/02 365/51 |
| 2014/0244927 | A1* | 8/2014 | Goldberg .............. | G06F 3/0689 711/114 |

* cited by examiner

*Primary Examiner* — Than Nguyen
(74) *Attorney, Agent, or Firm* — BainwoodHuang (57) ABSTRACT

Techniques change a type of a storage system. The techniques involve: determining, from a resource pool associated with the storage system, a set of used disks utilized by one stripe of the storage system and a set of spare disks unutilized by the stripe; determining a neighboring relationship between spare disks in the set of spare disks and used disks in the set of used disks, the neighboring relationship indicating a number of adjacencies between the spare disks and the used disks in a period of history time; selecting, based on the neighboring relationship, one spare disk from the set of spare disks as an expanded disk of the stripe; and updating the stripe of the storage system using extents of the expanded disk. Accordingly, the type of the storage system may be changed based on the existing resources to improve reliability and operating efficiency.

21 Claims, 6 Drawing Sheets

METHOD, DEVICE AND COMPUTER PROGRAM PRODUCT FOR CHANGING TYPE OF STORAGE SYSTEM

FIELD

The present disclosure relates to the field of storage management, and more specifically, to a method, a device and a computer program product for changing a type of a storage system.

BACKGROUND

As digital technology develops, the demands on storage capacity and reliability are increasing and a single storage device (such as a disk) can no longer satisfy the needs. At present, a storage system including a plurality of storage devices has been already developed such as a Redundant Array of Independent Disks (RAID) so as to improve capacity and reliability of data storage. RAID is a data storage virtualization technique, which combines a plurality of physical disk drives into a single logic unit to improve data redundancy, enhance data integration and advance fault tolerance and the like. In such a storage system, when one or more disks therein break down, the fault disk(s) may be detected and it is possible to recover the desired data from other disks in normal operation.

SUMMARY

In view of this, the present disclosure provides a method, device and computer program product for changing a type of the storage system.

According to one aspect of the present disclosure, there is provided a method for changing a type of a storage system. The method including: determining, from a resource pool associated with the storage system, a set of used disks utilized by one stripe of the storage system and a set of spare disks unutilized by the stripe; determining a neighboring relationship between spare disks in the set of spare disks and used disks in the set of used disks, the neighboring relationship indicating a number of adjacencies between the spare disks and the used disks in a historical time period; selecting, based on the neighboring relationship, one spare disk from the set of spare disks as an expanded disk of the stripe; and updating the stripe of the storage system using extents of the expanded disk.

According to another aspect of the present disclosure, there is provided a device for changing a type of a storage system. The device includes: one or more processors; a memory coupled to at least one processor of the one or more processors; and computer program instructions stored in the memory, which, when executed by the one or more processors, cause the device to: determine, from a resource pool associated with the storage system, a set of used disks utilized by one stripe of the storage system and a set of spare disks unutilized by the stripe; determine a neighboring relationship between spare disks in the set of spare disks and used disks in the set of used disks, the neighboring relationship indicating a number of adjacencies between the spare disks and the used disks in a historical time period; select, based on the neighboring relationship, one spare disk from the set of spare disks as an expanded disk of the stripe; and update the stripe of the storage system using extents of the expanded disk.

According to a further aspect of the present disclosure, there is provided a computer program product. The computer program product is tangibly stored on a non-transient computer-readable medium and includes machine-executable instructions, the machine-executable instructions, when executed, causing a machine to perform any steps of the method according to the first aspect of the present disclosure.

BRIEF DESCRIPTION OF THE DRAWINGS

The present disclosure will be understood better and other objectives, details, features and advantages of the present disclosure will become more apparent from the description of specific embodiments of the disclosure given in conjunction with the following figures, wherein.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will now be described in more detail in conjunction with accompanying figures. Although preferred embodiments of the present disclosure are shown in the accompanying figures, it should be understood that the present disclosure can be embodied in various ways but not be limited to the embodiments depicted herein. Instead, the embodiments are provided herein to make the disclosure more thorough and complete and convey the scope of the present disclosure to those skilled in the art.

Figure 1A:
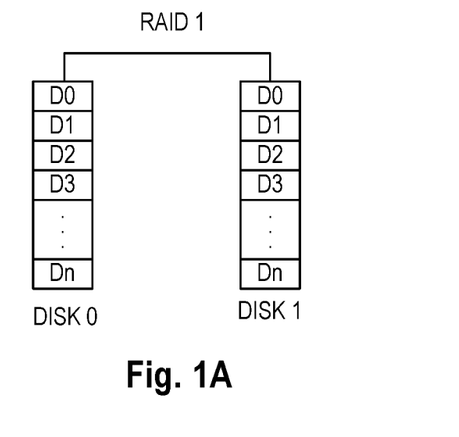
FIG. 1A illustrates a schematic diagram of a storage array according to the prior art.

For some types of storage systems, such as RAID 1, data is stored in a mirror manner. FIG. 1A illustrates a schematic diagram of a storage system according to the prior art. As shown in FIG. 1A, a storage system of mirror (RAID 1) type includes at least two physical disks (such as Disk 0 and Disk 1 as shown in FIG. 1A), each disk including a plurality of disk extents for storing data blocks D0, D1, . . . , Dn, respectively. It can be seen that the same data block is respectively stored in two extents of two disks in the RAID 1 type storage system, and each of the two disks is a mirror of the other. In this case, the storage system can normally operate as long as one of the two disks functions well. If one of the disks breaks down, data may be retrieved from the other disk. In terms of read operations of the storage system, since both of the two disks are operating, data can be read simultaneously from both of them, which makes the read operations rather quick. In terms of write operations of the storage system, the speed is slow because each write operation needs to be executed twice. Disk mirroring is a good choice for applications that require high performance and high reliability, such as transactional applications, emails and operating systems.

Figure 1B:
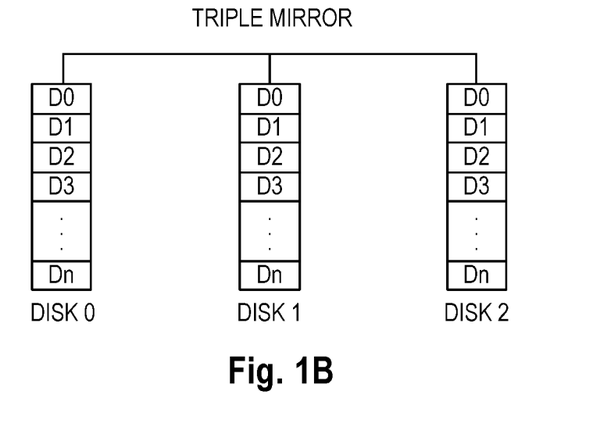
FIG. 1B illustrates a schematic diagram of another storage array according to the prior art.

FIG. 1B illustrates a schematic diagram of another storage system according to the prior art. This storage system can be known as a storage system of triple mirror type and its operation principle is similar to the RAID 1 or mirror storage system as shown in FIG. 1A. According to FIG. 1B, the triple mirror storage system includes at least three physical disks (such as Disk 0, Disk 1 and Disk 2 shown in FIG. 1B), each disk including a plurality of disk extents for storing data blocks D0, D1, . . . , Dn, respectively. It can be seen that the same data block is respectively stored in three extents of three disks in the triple mirror storage system, and each of the three disks is a mirror of another disk. In terms of read operations of the storage system, data can be read simultaneously from the three disks, which makes the read operations faster than that of RAID 1 shown in FIG. 1A. In terms of the write operations of the storage system, they are slower than that of RAID 1.

It can be seen that the triple mirror storage system may also operate normally even if two of the disks break down compared with the mirror storage system that can only tolerate one disk failure. Obviously, the failure probability of the triple mirror storage system is lower than that of the mirror storage system, i.e., RAID 1. Therefore, if the type of the storage system may be converted from mirror to triple mirror, it can significantly improve reliability and operating efficiency of the storage system.

However, a dedicated disk needs to be additionally introduced for the triple mirror storage system compared with the mirror storage system such that the amount of required hardware resources is large.

In view of the above problem, the present disclosure provides a solution for changing the type of the storage system. In this solution, it expands one single stripe of the storage system by determining (or identifying) spare disks that are unutilized by the single stripe in a resource pool and including the extents on the spare disks. The use of this solution can increase reliability and operating efficiency of the storage system while not increasing the overall hardware resource expenses. The solution according to embodiments of the present disclosure will be described below with reference to FIGS. 2 to 8.

Figure 2:
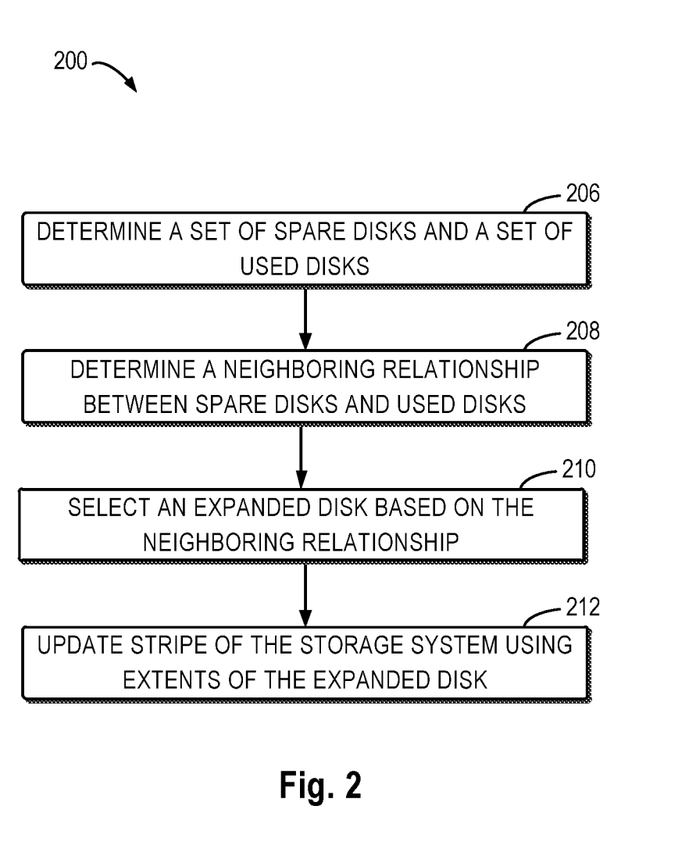
FIG. 2 illustrates a flowchart of a method for changing a type of a storage system according to some embodiments of the present disclosure.
Figure 3:
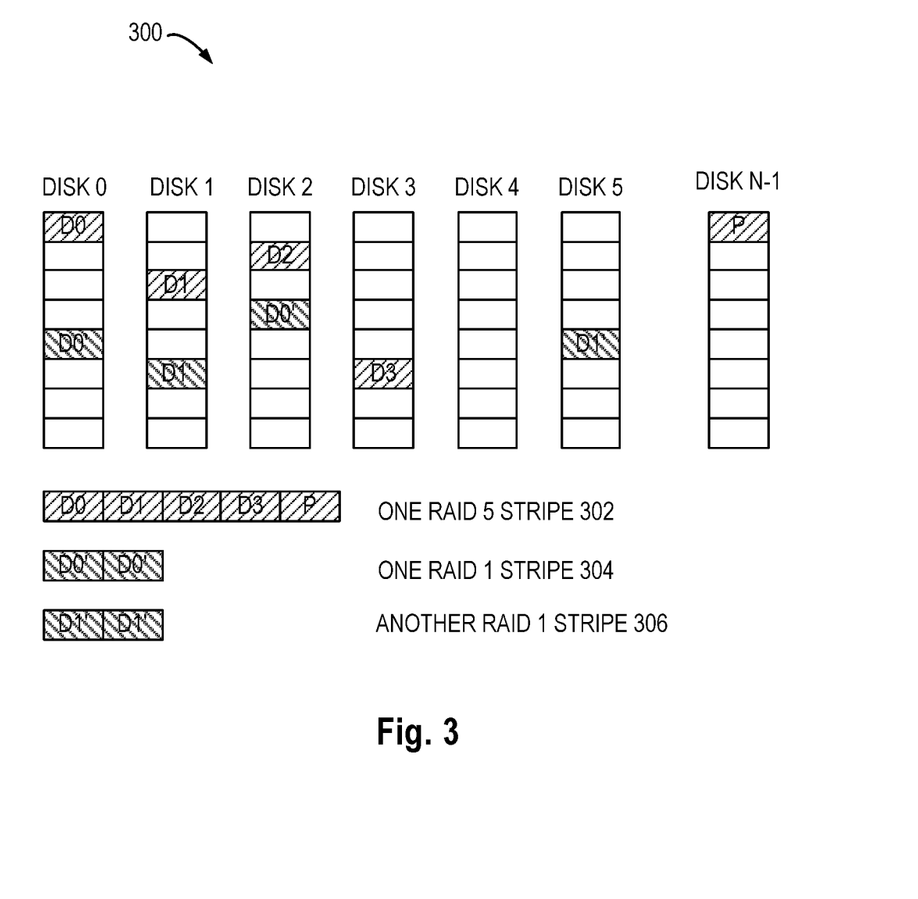
FIG. 3 illustrates a schematic diagram of a resource pool according to embodiments of the present disclosure.

FIG. 2 illustrates a flowchart of a method 200 for changing the type of the storage system according to some embodiments of the present disclosure. FIG. 3 illustrates a schematic diagram of a resource pool 300 according to embodiments of the present disclosure. The method shown in FIG. 2 will be described with reference to the resource pool 300 illustrated in FIG. 3 hereinafter.

As shown in FIG. 3, the resource pool 300 includes N disks and each disk contains a set of continuous, non-overlapping and fixed size extents. The resource pool 300 can be used for constructing same or different types of storage systems, and each storage system is composed of a plurality of stripes. Each stripe may include M disk extents, for example. The M disk extents come from different M disks of N disks in the resource pool 300, where M and N are natural numbers greater than 2 and N is greater than M. For example, an RAID 5 storage system can be constructed based on the resource pool 300. FIG. 3 illustrates a schematic diagram of a stripe 302 of an RAID 5 storage system with left oblique lines, which includes five extents respectively from Disk 0, Disk 1, Disk 2, Disk 3 and Disk N-1. The five extents store four data blocks D0, D1, D2, D3 and one parity block P, respectively. Moreover, an RAID 1 storage system may also be constructed based on the resource pool 300. FIG. 3 illustrates a schematic diagram of two stripes 304 and 306 of the RAID 1 storage system with right oblique line. The stripe 304 includes two disk extents respectively from Disk 0 and Disk 2, each of which is stored with mirrored data block D0'. The stripe 306 includes two disk extents respectively from Disk 1 and Disk 5, each of which is stored with mirrored data block D1'.

The resource pool 300 should manage information of all disks included therein and mapping relationship between stripes included in each storage system and the corresponding disk extents of each stripe. In this way, the operations on the storage system can operate the disk extent instead of the entire disk, i.e., the operated resource units can change from the entire disk to a slice of the disk (i.e., a disk extent) if the operating algorithm stays the same.

It can be seen that the number of disks in the resource pool is greater than the number of disks utilized by one storage system (also known as width of the storage system). Accordingly, it is possible that the type of the storage system may be changed without inserting a new disk, for example, converting a mirror storage system (RAID 1) to a triple mirror storage system. In addition, since all disk extents in one stripe come from different disks, it will not lower the efficiency of write operations even if the type of the storage system is converted from mirror to triple mirror.

As shown in FIG. 2, the method 200 includes a step 206, wherein it determines (or identifies), from a resource pool 300 associated with the storage system, a set of used disks utilized by one stripe of the storage system and a set of spare disks unutilized by the stripe; a step 208, wherein it determines (or ascertains) a neighboring relationship between the spare disks in the set of spare disks and used disks in the set of used disks, the neighboring relationship indicating the number of adjacencies between the spare disks and the used disks within a historical time period; a step 210, wherein it selects, based on the neighboring relationship, one spare disk from the set of spare disks as an expanded disk of the stripe; and a step 212, wherein it updates the stripe of the storage system using disk extents of the expanded disk. The more detailed description of steps 206 to 212 can refer to steps 406 to 412 of the method 400 depicted below with reference to FIG. 4.

Figure 4:
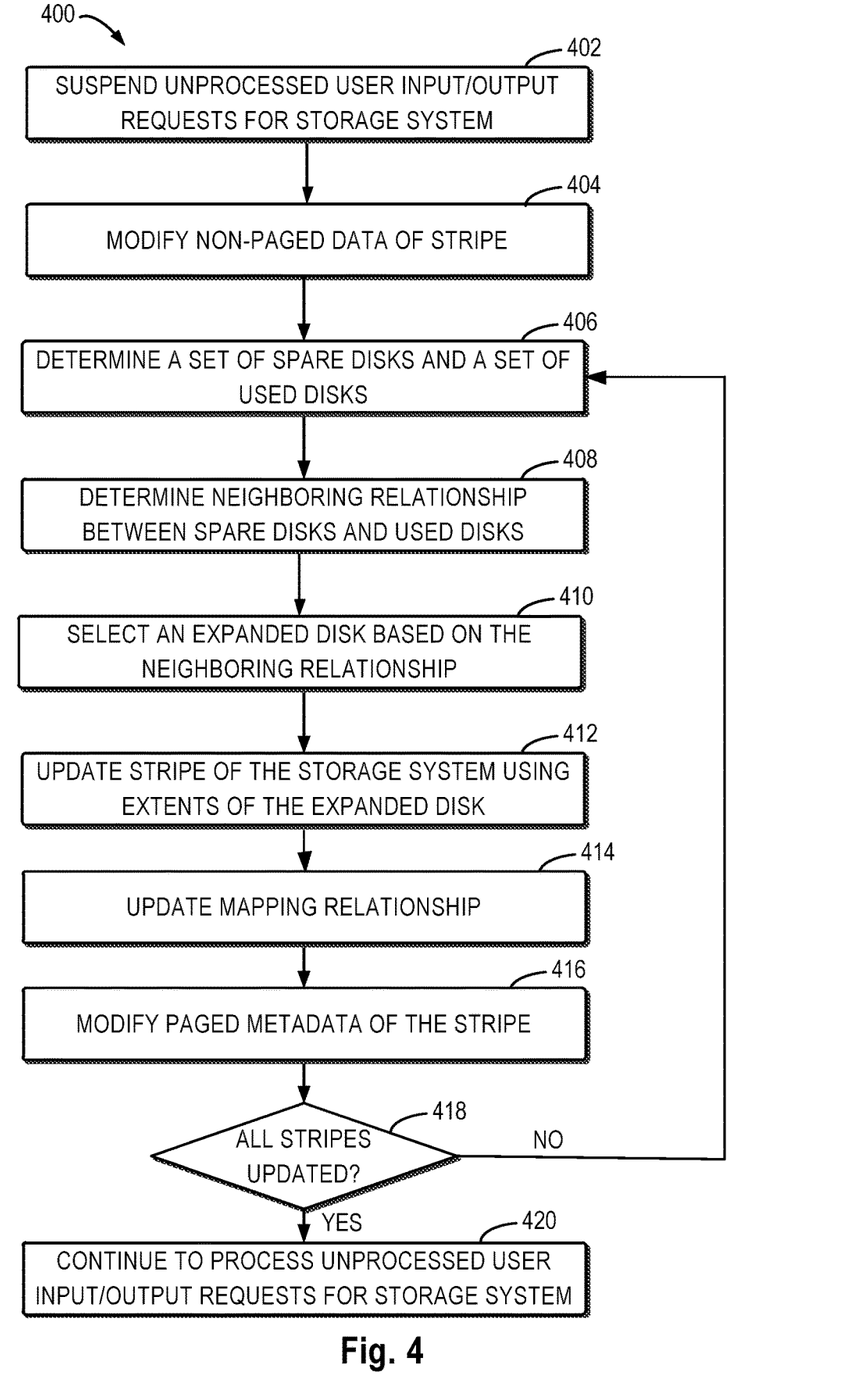
FIG. 4 illustrates a flowchart of a method for changing a type of a storage system according to some further embodiments of the present disclosure.

FIG. 4 illustrates a flowchart of a method 400 for changing a type of the storage system according to some further embodiments of the present disclosure. Here, embodiments of the present disclosure will be described by taking the example of converting the type of the storage system from mirror to triple mirror. However, those skilled in the art may understand that the present disclosure may also be applied to other type conversion of storage systems. The method 400 will be described below with reference to FIG. 3 to FIG. 7. It can be appreciated that embodiments of the method 400 is a more specific implementation of the embodiments of method 200.

It still takes the resource pool 300 shown in FIG. 3 as an example, wherein it contains N disks and each disk includes a set of continuous, non-overlapping and fixed size disk extents. One storage system is composed of a plurality of stripes, each stripe including M disk extents respectively from M disks in the resource pool 300, wherein M and N are natural numbers greater than 2 and N is greater than M. By taking the RAID 1 storage system as an example, each stripe of the RAID 1 storage system includes two disk extents from two different disks. For example, the RAID 1 stripe 304 includes two disk extents respectively from Disk 2 and Disk 4, and the two disk extents are each stored with a mirrored data block D0'. The RAID 1 stripe 306 includes two disk extents respectively from Disk 1 and Disk 5, and the two disk extents are each stored with a mirrored data block D1'.

For each stripe, such as the stripe 304, it comes from two different disks in the resource pool 300, i.e., Disk 0 and Disk 2. Therefore, the key point to change the type of the storage system is to select a new disk from the resource pool 300 as a third mirror disk of the stripe 304.

For this, the method 400 includes a step 406, which is similar to the step 206. At the step 406, it determines, from the resource pool 300 associated with the storage system (such as the RAID 1 storage system described above with reference to FIG. 3), a set of used disks utilized by one stripe (such as the stripe 304) of the storage system and a set of spare disks unutilized by the stripe.

In some embodiments, determining the set of used disks and the set of spare disks includes: determining whether one disk in the resource pool 300 has an extent included in the stripe. If it is determined that one disk in the resource pool 300 has an extent included in the stripe (such as the stripe 304), the disk is determined as a used disk of the stripe. On the contrary, if it is determined that one disk in the resource pool 300 lacks an extent included in the stripe (such as the stripe 304), the disk is determined as a unused disk unutilized by the stripe.

Take the stripe 304 shown in FIG. 3 as an example, and the strip 304 occupies one extent of Disk 0 and one extent of Disk 2 in the resource pool 300 without occupying extents of other disks in the resource pool 300. Therefore, Disk 0 and Disk 2 are determined as used disks of the stripe 304 and Disk 1, Disk 3, Disk 4, . . . , Disk N-1 are determined as unused disks unutilized by the stripe 304. Accordingly, the set of used disks of the stripe 304 can be represented as (Disk 0, Disk 2), and the set of spare disks of the stripe 304 can be represented as (Disk 1, Disk 3, Disk 4, . . . , Disk N-1).

Next, at the step 408, similar to the step 208, it determines a neighboring relationship between the spare disks in the set of spare disks and the used disks in the set of used disks of the stripe, the neighboring relationship indicating the number of adjacencies between the spare disks and the used disks within a historical time period.

In some embodiments, determining the neighboring relationship between each spare disk and each used disk may include directly computing the number of adjacencies between the spare disk and the used disk within the historical time period.

In some further embodiments, determining the neighboring relationship between each spare disk and each used disk may include establishing a neighborhood matrix for the resource pool 300, and searching the neighborhood matrix for the neighboring relationship between the spare disk and the used disk, wherein an element in the neighborhood matrix indicates the number of adjacencies between one disk and another disk in the resource pool within the historical time period.

For the resource pool 300 consisting of N disks, the neighborhood matrix is an N*N square matrix. Each element (also known as neighborhood value) in the neighborhood matrix can be denoted as NW (i, j), which represents the number of adjacencies between Disk i and Disk j in the resource pool 300 (i, j=0, 1, 2, . . . , N-1). While constructing one stripe of the storage system, it will select some extents from different disks and these disks are defined as being adjacent with each other once. It can be understood that the neighborhood matrix is a symmetric matrix according to its definition and the neighborhood value NW (i, j) equals to NW (j, i), and all elements on the diagonal of the neighborhood matrix are 0.

In order to enable all other disks to participate in spare disk selection as much as possible when one disk breaks down, it is beneficial to make all disks involved in one stripe distribute evenly in the whole resource pool 300. Therefore, the neighborhood values in the neighborhood matrix should be close to each other as much as possible, i.e., the neighborhood matrix should be as "flat" as possible.

Figure 5:
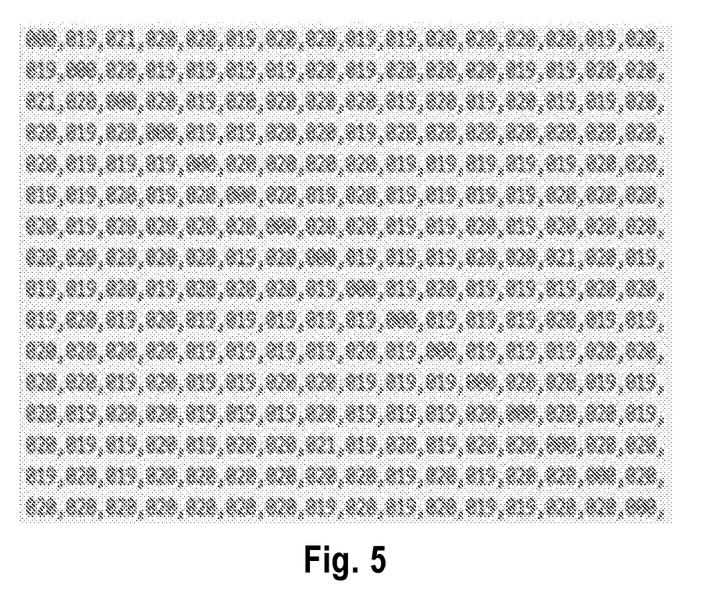
FIG. 5 illustrates a schematic diagram of a neighborhood matrix of a resource pool according to the present disclosure.

FIG. 5 illustrates a schematic diagram of a neighborhood matrix of a resource pool according to the present disclosure. As shown in FIG. 5, elements (neighborhood values) in the neighborhood matrix are extremely close to each other ranging from 19 to 21. In the example of FIG. 5, it is assumed that the number of disks in the resource pool 300 is N=16. However, those skilled in the art will understand that this is by way of example only and shall not restrict the scope of the present disclosure.

At the step 410, similar to the step 210, it selects, based on the neighboring relationship between the spare disks in the set of spare disks and the used disks in the set of used disks, one spare disk from the set of spare disks as an expanded disk.

In some embodiments, selecting one spare disk can include computing a score of each spare disk in the set of spare disks based on the neighboring relationship, and selecting a spare disk with a minimum score from the set of spare disks as the expanded disk of the stripe.

Take the neighborhood matrix shown in FIG. 5 as an example. Assuming that the stripe 304 occupies one extent in the Disk 0 and one extent in the Disk 2, a neighborhood value between each spare disk (Disk 1, Disk 3, Disk 4, . . . , Disk N-1) of the stripe 304 and the Disk 0 is denoted as $V_1$ and a neighborhood value between the spare disk and the Disk 2 is denoted as $V_2$. In this case, the score of the spare disk can be represented as $V_1+V_2$. By repeating on all (N-2) spare disks of the stripe 304, it can acquire the scores {score [1], score [3], . . . , score [N-1 ]} of the N-2 spare disks of the stripe 304.

Figure 6:
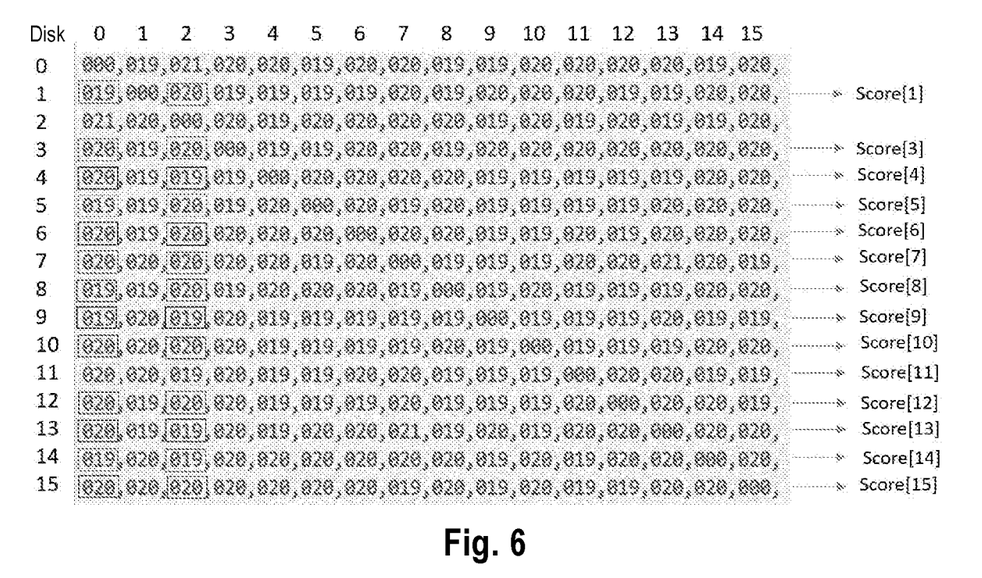
FIG. 6 illustrates a schematic diagram of scores of spare disks of the stripe acquired according to the neighborhood matrix shown in FIG. 5.

FIG. 6 illustrates a schematic diagram of scores of the spare disks of the stripe 304 acquired according to the neighborhood matrix shown in FIG. 5. Numbers in the boxes respectively show the neighborhood values $V_1$ and $V_2$ between each spare disk and each used disk. Score [1] is a sum of {V₁, V₂} of Disk 1, score [3] is a sum of {V₁, V₂} of Disk 3, and so on and so forth to get {score [1], score [3], score [4], . . . , score [15]}. It can be seen that score [9] of the spare disk 9 is the minimum, so Disk 9 is selected as the expanded disk of the stripe 304 at the step 410.

Next, at a step 412, similar to the step 212, the stripe 304 is updated using extents of Disk 9. Here, it can select from Disk 9 any one of the extents not occupied as a triple mirror extent of the stripe 304.

In case of determining neighboring relationship between the spare disks and the used disks by using the neighborhood matrix, the method 400 may also include updating the neighborhood matrix based on the selected expanded disk (not shown in the figure) after the step 412.

In some embodiments, when the operating system is booting up, it first creates a resource pool object. The operating system will scan non-paged region of all disk extents, validate information of configuration and metadata and discover the mapped storage system and Logic Unit Number (LUN) objects. According to the configuration, the mapped storage system will prepare the memory for a mapping table, initialize the mapping table entries of the stripe, and then bring up the LUN object. In the mapped storage system object, each LUN has a descriptor to record its configuration and the mapping table pointer. The descriptor records the geometry parameters of the storage system, such as storage system type, width, performance tier, stripe count, total capacity, etc. All the LUN descriptors are queued to the LUN list of the mapped storage system object.

When the LUN serves Input/Output (I/O), the mapping table is frequently accessed to route the I/O to the backend disks. The stripe mapping table is loaded into the memory when the LUN object is created.

In this method, the mapping table of LUN is split into multiple sub-tables with the same size of memory. Each sub-table records a bunch of stripe mapping information, which describes a continuous space of LUN capacity. All sub-table pointers will be stored in a global mapping table vector in sequence. When the LUN expands the capacity, the mapped storage system object will allocate the disk extents from the resource pool and fill the stripe in the free slot of the sub-tables. Once the sub-tables are full, the mapped storage system object must allocate a new sub-table, initialize the free slot and push it to the end of the global mapping table vector. When the LUN shrinks its capacity, the stripe in the sub-table can be released. If the sub-table does not have any stripes, the sub-table can be released and popped from the mapping table vector.

Figure 7:
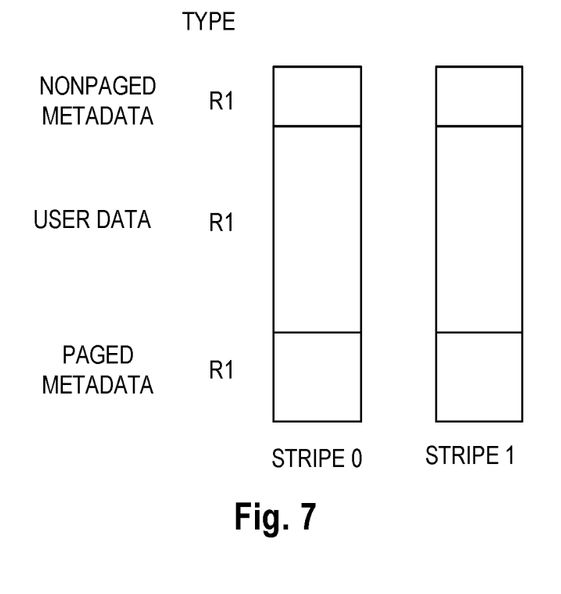
FIG. 7 illustrates a schematic diagram of layout of stripe metadata of a storage system according to the present disclosure.

The metadata of the stripe falls into two categories: paged and non-paged metadata. For each stripe, paged and non-paged metadata should be maintained in the metadata region of the stripe. FIG. 7 illustrates a schematic diagram of layout of stripe metadata of a storage system according to the present disclosure. As shown in FIG. 7, the space of one stripe is split into three regions and the non-paged metadata region is located at the top of each disk extent, wherein the non-paged metadata are mirrored on all disk extents. The non-paged metadata amount is usually small and the non-paged metadata will be loaded into the memory when the system starts up. The user data region is split into a bunch of 1-megabyte block crossing all disk extents, and each block has a segment of paged metadata to describe the rebuild status. The user data and the paged metadata have the same storage system type, which is defined when the stripes of the storage system are allocated for the LUN. The capacity of the paged metadata depends on the number of blocks of the stripe.

Therefore, it may also require modifications on the metadata of the stripe 304 and the mapping table while executing the above method 400. Since the non-paged metadata is mirrored for each stripe, it can be executed prior to stripe update. However, the paged metadata and the mapping table are specific to the stripe, so they can be executed after stripe update.

In some embodiments, the method 400 may also include a step 404 before the step 408, wherein the non-paged metadata of the stripe 304 is modified. The non-paged metadata of the stripe 304 includes at least one of: storage system type, stripe width and extent position. Table 1 below illustrates a list of entries that might be included in the non-paged metadata of the RAID stripe.

TABLE 1

Non-paged metadata of RAID stripe

| Field | Meanings |
| --- | --- |
| Header | Valid bit |
| LUN ID | ID of LUN to which this stripe belongs |
| Storage System ID | ID of the storage system to which this stripe belongs |
| Storage System Type | protect level of storage system of this stripe |
| Width | disk extent count |
| Disk Stripe Size | the number of sectors of disk extent |
| Disk Stripe Mapping Table | position of disk extent |

For example, it may modify the storage system type of the above non-paged metadata from mirror to triple mirror and modify the width from 2 to 3 at the step 404.

Besides, the method 400 may also include a step 414 after the step 412, wherein it updates a mapping relationship between extents in the stripe 304 and extents in the resource pool 300. It can implement a new disk extent insertion by modifying the mapping relationship between the stripe and the extents. For example, in case of converting the storage system from mirror type to the triple mirror type, updating the mapping relationship may include configuring the extent of the selected expanded disk as a third position for rebuild. The mapping relationship, for example, is indicated in the form of the mapping table shown in Table 2 below.

TABLE 2

Stripe mapping table

| Valid bit | State | Disk index | Disk extent index |
| --- | --- | --- | --- |

Herein, the most important information included in the mapping table is "disk index" and "disk extent index," the "disk index" being disk number and the "disk extent index" being an index of an extent on the disk.

The method 400 may also include a step 416, in which the paged metadata of the stripe 304 is modified. The paged metadata takes the extent of the expanded disk selected at the step 412 as the rebuild position when the stripe 304 fails. Table 3 below illustrates a list of entries that might be included in the paged metadata of the RAID stripe.

TABLE 3

Paged metadata of stripe

| Field | Meanings |
| --- | --- |
| Valid bit | the paged metadata record being valid or not |

TABLE 3-continued

Paged metadata of stripe

| Field | Meanings |
|---|---|
| Rebuild bitmask | the disk extent bitmask to indicate which position needs to be rebuilt |
| Position | the position which needs to be rebuilt |
| Checkpoint | the rebuild pointer |

Since update of the paged metadata and the mapping relationship only involve read/write of the memory without data copy between disks, this procedure only takes a short time, for example, less than a second.

The above steps 406 to 416 describe a more detailed embodiment of updating one stripe in the storage system. In case of changing the type of the entire storage system, the method 400 may also include a step 416, in which it determines whether all stripes of the storage system have been updated or not. In response to determining that there are still stripes not updated in the storage system, the method 400 returns to the step 406 to update the stripes not updated in the storage system.

After updating all stripes in the storage system, the storage system becomes a degraded triple mirror storage system. Then, the operating system starts the background rebuilding service to rebuild the storage system. After the completion of rebuild, the type of the storage system will convert from the mirror type into a normal triple mirror type.

In order to ensure that the user input/output operation is not affected during the type conversion of the storage system, the method 400 may also include: before the conversion starts, suspending the processing of all unprocessed user input/output requests for the storage system (step 402). In other words, before the start of type conversion of the storage system, it should complete all ongoing user input/output requests and hang up all unprocessed user input/output requests. Any new-coming user input/output requests are queued after the unprocessed user input/output requests. The suspending operation for the user input/output is sometimes also known as quiesce in the art.

Correspondingly, after the conversion completes, the method 400 also includes: continuing to process the unprocessed user input/output requests for the storage system (step 420).

In addition, in some embodiments, in order to ensure that the type conversion of the storage system is atomic, the method 400 should be completed within one transaction. When any step of the method 400 fails, the method 400 is terminated and the type of the storage system will be rolled back to the original type. That is, the basic unit of type conversion is a stripe. If any step in the conversion procedure of one stripe, such as mapping table modification or disk extent distribution, fails, the conversion procedure of the stripe fails as well.

Figure 8:
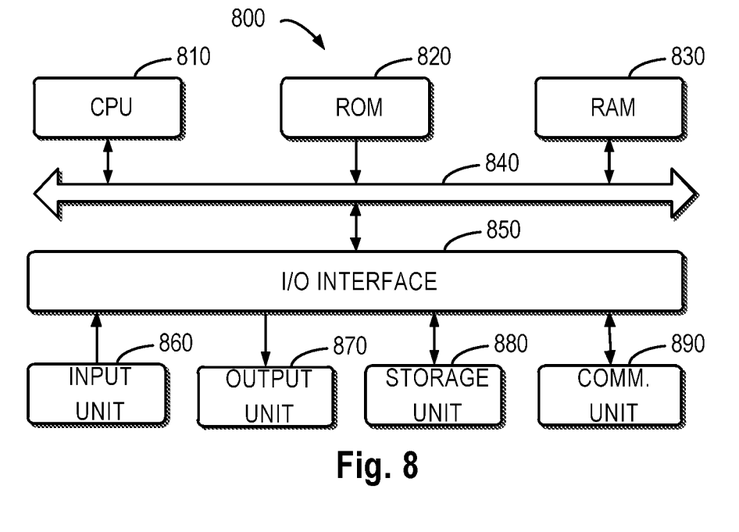
FIG. 8 illustrates a schematic block diagram of an example device for implementing embodiments of the present disclosure.

FIG. 8 illustrates a schematic block diagram of an example device 800 for implementing embodiments of the present disclosure. As shown, the device 800 includes a central process unit (CPU) 810, which can execute various suitable actions and processing based on the computer program instructions stored in the read-only memory (ROM) 820 or computer program instructions loaded in the random-access memory (RAM) 830 from a storage unit 880. The RAM 830 may also store all kinds of programs and data required by the operations of the device 800. CPU 810, ROM 820 and RAM 830 are connected to each other via a bus 840. The input/output (I/O) interface 850 is also connected to the bus 840.

A plurality of components in the device 800 is connected to the I/O interface 850, including: an input unit 860, such as a keyboard, a mouse and the like; an output unit 870, e.g., various kinds of displays and loudspeakers, etc.; a storage unit 880, such as a disk, a disc, etc.; and a communication unit 890, such as a network card, a modem, a wireless transceiver and the like. The communication unit 890 allows the device 800 to exchange information/data with other devices via the computer network such as Internet, and/or various telecommunication networks.

Each of the above described procedures and processing, such as method 200 and 400, can also be executed by the processing unit 810. For example, in some embodiments, the methods 200 and 400 can be implemented as a computer software program tangibly included in the machine-readable medium, e.g., the storage unit 880. In some embodiments, the computer program can be partially or fully loaded and/or installed to the device 800 via the ROM 820 and/or the communication unit 890. When the computer program is loaded to the RAM 830 and executed by the CPU 810, one or more steps of the above described methods 200 and 400 can be implemented.

The present disclosure can be a method, an apparatus, a system and/or a computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or other freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper transmission cable, optical fiber transmission, wireless transmission, router, firewall, switch, network gateway computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instruction set architecture (ISA) instructions, machine instructions, machine-related instructions, microcode, firmware instructions, state setting data, or source codes or target codes written in any combinations of one or more programming languages, wherein the programming languages include object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software kit, partially on the user computer and partially on the remote computer, or completely on the remote computer or server. In case where a remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described herein with reference to flow chart and/or block diagrams of method, apparatus (device) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagrams in the drawings illustrate system architecture, functions and operations that may be implemented by the system, method and computer program product according to multiple embodiments of the present disclosure. In this regard, each block in the flow chart or block diagram can represent a module, a program segment or part of codes, wherein the module, the program segment or part of codes include one or more executable instructions for performing stipulated logic functions. In some alternative implementations, it should be noted that the functions indicated in the blocks can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is by way of example only rather than exhaustive and is not limited to the embodiments of the present disclosure. Many modifications and alterations are obvious for those skilled in the art without deviating from the scope and spirit of the explained various embodiments. The selection of terms in the text aims to best explain principles and actual applications of each embodiment and technical improvements made in the market by each embodiment, or enable other ordinary skilled in the art to understand embodiments of the present disclosure.

We claim:

1. A method for changing a type of a storage system, comprising:
   determining, from a resource pool associated with the storage system, a set of used disks utilized by one stripe of the storage system and a set of spare disks unutilized by the stripe;
   determining a neighboring relationship between spare disks in the set of spare disks and used disks in the set of used disks, the neighboring relationship indicating a number of adjacencies between the spare disks and the used disks in a historical time period;
   selecting, based on the neighboring relationship, one spare disk from the set of spare disks as an expanded disk of the stripe; and
   updating the stripe of the storage system by using extents of the expanded disk.

2. The method of claim 1, wherein determining the set of spare disks and the set of used disks comprises:
   determining whether a disk in the resource pool has an extent included in the stripe of the storage system;
   in response to determining the disk having the extent included in the stripe of the storage system, determining the disk as a used disk of the stripe; and
   in response to determining the disk having no extent included in the stripe of the storage system, determining the disk as a spare disk of the stripe.

3. The method of claim 1, wherein determining the neighboring relationship between the spare disks and the used disks comprises:
   establishing a neighborhood matrix for the resource pool, each element in the neighborhood matrix indicating a number of adjacencies between one disk and another disk in the resource pool within the historical time period; and
   searching the neighborhood matrix for the neighboring relationship between the spare disks and the used disks.

4. The method of claim 3, further comprising:
   updating the neighborhood matrix based on the expanded disk.

5. The method of claim 1, wherein selecting the expanded disk from the set of spare disks comprises:
  computing, based on the neighboring relationship, a score of each spare disk in the set of spare disks; and
  selecting, from the set of spare disks, a spare disk with a minimum score as the expanded disk of the stripe.

6. The method of claim 1, further comprising:
  prior to determining the neighboring relationship, modifying non-paged metadata of the stripe, the non-paged metadata including at least one of: the type of the storage system, a width of the stripe, an extent position and an identifier of a slot of the stripe.

7. The method of claim 1, further comprising:
  updating a mapping relationship between extents in the stripe and extents in the resource pool.

8. The method of claim 7, further comprising:
  modifying paged metadata of the stripe, the paged metadata indicating the selected extent as a rebuild position for the stripe when the stripe fails.

9. The method of claim 1, further comprising:
  prior to determining the neighboring relationship, suspending processing of unprocessed user input/output requests for the storage system.

10. The method of claim 9, further comprising:
  after updating all stripes of the storage system, continuing to process the unprocessed user input/output requests for the storage system.

11. A device for changing a type of a storage system, comprising:
  a set of processors;
  a memory coupled to the set of processors, the memory storing computer program instructions which, when executed by the set of processors, cause the device to:
    determine, from a resource pool associated with the storage system, a set of used disks utilized by one stripe of the storage system and a set of spare disks unutilized by the stripe;
    determine a neighboring relationship between spare disks in the set of spare disks and used disks in the set of used disks, the neighboring relationship indicating a number of adjacencies between the spare disks and the used disks in a historical time period;
    select, based on the neighboring relationship, one spare disk from the set of spare disks as an expanded disk of the stripe; and
    update the stripe of the storage system by using extents of the expanded disk.

12. The device of claim 11, wherein the computer program instructions stored in the memory, when executed by the one or more processors, further cause the device to:
  determine whether a disk in the resource pool has an extent included in the stripe of the storage system;
  in response to determining the disk having the extent included in the stripe of the storage system, determine the disk as a used disk of the stripe; and
  in response to determining the disk having no extent included in the stripe of the storage system, determine the disk as a spare disk of the stripe.

13. The device of claim 11, wherein the computer program instructions stored in the memory, when executed by the one or more processors, further cause the device to:
  establish a neighborhood matrix for the resource pool, each element in the neighborhood matrix indicating a number of adjacencies between one disk and another disk in the resource pool within the historical time period;
  search the neighborhood matrix for the neighboring relationship between the spare disks and the used disks.

14. The device of claim 13, wherein the computer program instructions stored in the memory, when executed by the one or more processors, further cause the device to:
  update the neighborhood matrix based on the expanded disk.

15. The device of claim 11, wherein the computer program instructions stored in the memory, when executed by the one or more processors, further cause the device to:
  compute, based on the neighboring relationship, a score of each spare disk in the set of spare disks; and
  select, from the set of spare disks, a spare disk with a minimum score as the expanded disk of the stripe.

16. The device of claim 11, wherein the computer program instructions stored in the memory, when executed by the one or more processors, further cause the device to:
  prior to determining the neighboring relationship, modify non-paged metadata of the stripe, the non-paged metadata including at least one of: the type of the storage system, a width of the stripe, an extent position and an identifier of a slot of the stripe.

17. The device of claim 11, wherein the computer program instructions stored in the memory, when executed by the one or more processors, further cause the device to:
  update a mapping relationship between extents in the stripe and extents in the resource pool.

18. The device of claim 17, wherein the computer program instructions stored in the memory, when executed by the one or more processors, further cause the device to:
  modify paged metadata of the stripe, the paged metadata indicating the selected extent as a rebuild position for the stripe when the stripe fails.

19. The device of claim 11, wherein the computer program instructions stored in the memory, when executed by the one or more processors, further cause the device to:
  prior to determining the neighboring relationship, suspend processing of unprocessed user input/output requests for the storage system.

20. The device of claim 19, wherein the computer program instructions stored in the memory, when executed by the one or more processors, further cause the device to:
  after updating all stripes of the storage system, continue to process the unprocessed user input/output requests for the storage system.

21. A computer program product having a non-transitory computer readable medium which stores a set of instructions for changing a type of a storage system; the set of instructions, when carried out by computerized circuitry, causing the computerized circuitry to perform a method of:
  determining, from a resource pool associated with the storage system, a set of used disks utilized by one stripe of the storage system and a set of spare disks unutilized by the stripe;
  determining a neighboring relationship between spare disks in the set of spare disks and used disks in the set of used disks, the neighboring relationship indicating a number of adjacencies between the spare disks and the used disks in a historical time period;
  selecting, based on the neighboring relationship, one spare disk from the set of spare disks as an expanded disk of the stripe; and
  updating the stripe of the storage system by using extents of the expanded disk.

* * * * *